United States Patent
Walsh

(10) Patent No.: US 10,873,872 B2
(45) Date of Patent: *Dec. 22, 2020

(54) MONITORING NETWORK COMMUNICATIONS FOR MOBILE VEHICLES

(71) Applicant: ViaSat Inc., Carlsbad, CA (US)

(72) Inventor: Richard G. Walsh, Bonsall, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,182

(22) Filed: Oct. 7, 2019

(65) Prior Publication Data

US 2020/0037195 A1  Jan. 30, 2020

Related U.S. Application Data

(63) Continuation of application No. 16/049,780, filed on Jul. 30, 2018, now Pat. No. 10,499,273.

(51) Int. Cl.
*H04W 24/10* (2009.01)
*H04L 12/26* (2006.01)

(52) U.S. Cl.
CPC .......... *H04W 24/10* (2013.01); *H04L 43/045* (2013.01); *H04L 43/06* (2013.01)

(58) Field of Classification Search
CPC ....... H04W 24/10; H04L 43/045; H04L 43/06
USPC ...................................................... 455/405
See application file for complete search history.

(56) References Cited

U.S. PATENT DOCUMENTS

| | | | |
|---|---|---|---|
| 6,112,083 A * | 8/2000 | Sweet | H04B 7/18545 379/203.01 |
| 10,248,914 B2 * | 4/2019 | Stoughton | G06Q 10/063 |
| 2005/0171835 A1 * | 8/2005 | Mook | G08G 1/20 705/333 |
| 2008/0134046 A1 | 6/2008 | Gray et al. | |
| 2013/0031238 A1 | 1/2013 | Grossklas et al. | |
| 2013/0285855 A1 | 10/2013 | Dupray et al. | |
| 2014/0025440 A1 | 1/2014 | Nagda et al. | |
| 2017/0085436 A1 | 3/2017 | Costa et al. | |
| 2017/0085437 A1 | 3/2017 | Condeixa et al. | |
| 2017/0126521 A1 | 5/2017 | Lala | |
| 2017/0195897 A1 * | 7/2017 | Lopes | H04L 69/40 |
| 2017/0215021 A1 * | 7/2017 | de Azevedo | H04W 4/50 |
| 2018/0091394 A1 * | 3/2018 | Richards | H04L 41/0604 |
| 2018/0123939 A1 | 5/2018 | Raman et al. | |

(Continued)

*Primary Examiner* — Mong-Thuy T Tran
(74) *Attorney, Agent, or Firm* — Holland & Hart LLP

(57) ABSTRACT

Systems and methods for monitoring network communications for mobile vehicles are described. A method may include receiving vehicle data items for each of the mobile vehicles of the fleet of mobile vehicles. The vehicle data items may include vehicle identifiers, such as fleet number or vehicle number; route information; origin and destination, etc. The method may include receiving network communication metrics associated with a network access service provided to devices on the fleet. The method may include presenting, to a user, multiple aggregation options, with each aggregation option associated with a vehicle data item. The method may include receiving, from the user, selection of an aggregation option and presenting, to the user, a list of vehicle data items organized by the first vehicle data item, along with a plurality of network communication metric options selected by the user.

20 Claims, 7 Drawing Sheets

(56) References Cited

U.S. PATENT DOCUMENTS

2018/0220283 A1* 8/2018 Condeixa ............... H04L 67/12
2018/0350024 A1* 12/2018 Kaufman ........... G06Q 10/0833

* cited by examiner

MONITORING NETWORK COMMUNICATIONS FOR MOBILE VEHICLES

CROSS REFERENCE

The present Application for Patent is a continuation of U.S. patent application Ser. No. 16/049,780 by WALSH, entitled "MONITORING NETWORK COMMUNICATIONS FOR MOBILE VEHICLES," filed Jul. 30, 2018, which is incorporated herein by reference in their entirety.

BACKGROUND

As evolving satellite technologies have enabled relatively high-speed network communications with mass transportation vehicles such as airplanes, and ships, passenger utilization of these services has increased. The availability of reliable, high-speed Internet and other network communication services have become important market differentiators for some fleet operators. As a result, monitoring network communication usage and quality has become increasingly critical. Improved systems and methods for analyzing network communication services for mobile vehicles may be useful.

SUMMARY

In view of the foregoing, aspects of monitoring network communications for mobile vehicles are described below.

A method of monitoring network communication quality for a fleet of one or more mobile vehicles is described. The method may include receiving a first set of vehicle data items for each of the mobile vehicles of the fleet of mobile vehicles. The method may include receiving one or more network communication metrics associated with a network access service provided by a communication system to multiple devices on the fleet of one or more mobile vehicles via respective network access terminals of the fleet of one or more mobile vehicles. The method may include presenting, to a user, multiple aggregation options, where each aggregation option is associated with a first vehicle data item of the first set of vehicle data items. The method may include receiving, from the user, a first indication of an aggregation option of the aggregation options. The method may include, in response to receiving the indication, presenting, to the user, a list of at least a portion of the first set of vehicle data items organized by the first vehicle data item. The method may include presenting, to the user, multiple network communication metric options. The method may include receiving, from the user, a second indication of a first network communication metric option of the network communication metric options. The method may include, in response to receiving the second indication, concurrently presenting, to the user, the portion of the first set of vehicle data items and a first subset of the one or more network communication metrics for each of the one or more mobile vehicles based at least in part on the second indication. In some cases, the first subset is presented organized by the first vehicle data item.

An apparatus for monitoring network communication quality for a fleet of one or more mobile vehicles is described. The apparatus may include a processor, memory in electronic communication with the processor, and instructions stored in the memory. The instructions may be executable by the processor to cause the apparatus to receive a first set of vehicle data items for each of the mobile vehicles of the fleet of mobile vehicles. The instructions may be executable to receive one or more network communication metrics associated with a network access service provided by a communication system to a plurality of devices on the fleet of one or more mobile vehicles via respective network access terminals of the fleet of one or more vehicles. The instructions may be executable to present, to a user, multiple aggregation options, where each aggregation option is associated with a first vehicle data item of the first set of vehicle data items. The instructions may be executable to receive, from the user, a first indication of an aggregation option. The instructions may be executable to, in response to receiving the indication, present, to the user, a list of at least a portion of the first set of vehicle data items organized by the first vehicle data item. The instructions may be executable to present, to the user, multiple network communication metric options. The instructions may be executable to receive, from the user, an indication of a first network communication metric option. The instructions may be executable to, in response to receiving the second indication, concurrently present, to the user, the portion of the first set of vehicle data items and a first subset of the one or more network communication metrics for each of the mobile vehicles based at least in part on the second indication. In some cases, the first subset is presented organized by the first vehicle data item.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A communications satellite may be configured to provide network communications to target devices (e.g., terminals) which may be mobile (e.g., installed or operated on a motor vehicle, a boat, a plane, a train, etc.). The devices may be located on mobile vehicles that are members of a fleet of mobile vehicles, such as a fleet of aircraft, for example. Each mobile vehicle in a fleet may be associated with various vehicle data items, which may include vehicle identifiers, route identifiers, fleet identifiers, etc. In some cases, fleet operators may monitor fleet operations based on the vehicle data items.

Passengers on a mobile vehicle may use mobile devices during a trip for accessing the Internet or for other network services, for example. Network service providers may monitor and collect network communication service metrics associated with the network communication services during a trip to identify periods of degraded service or lapses in service.

Historically, network communication performance and fleet operations have been monitored and analyzed independently, for different purposes. However, various aspects of the instant application provide methods and tools for aggregating and viewing network communication metrics based on vehicle data items to enable fleet-based network communication analysis.

Figure 1:
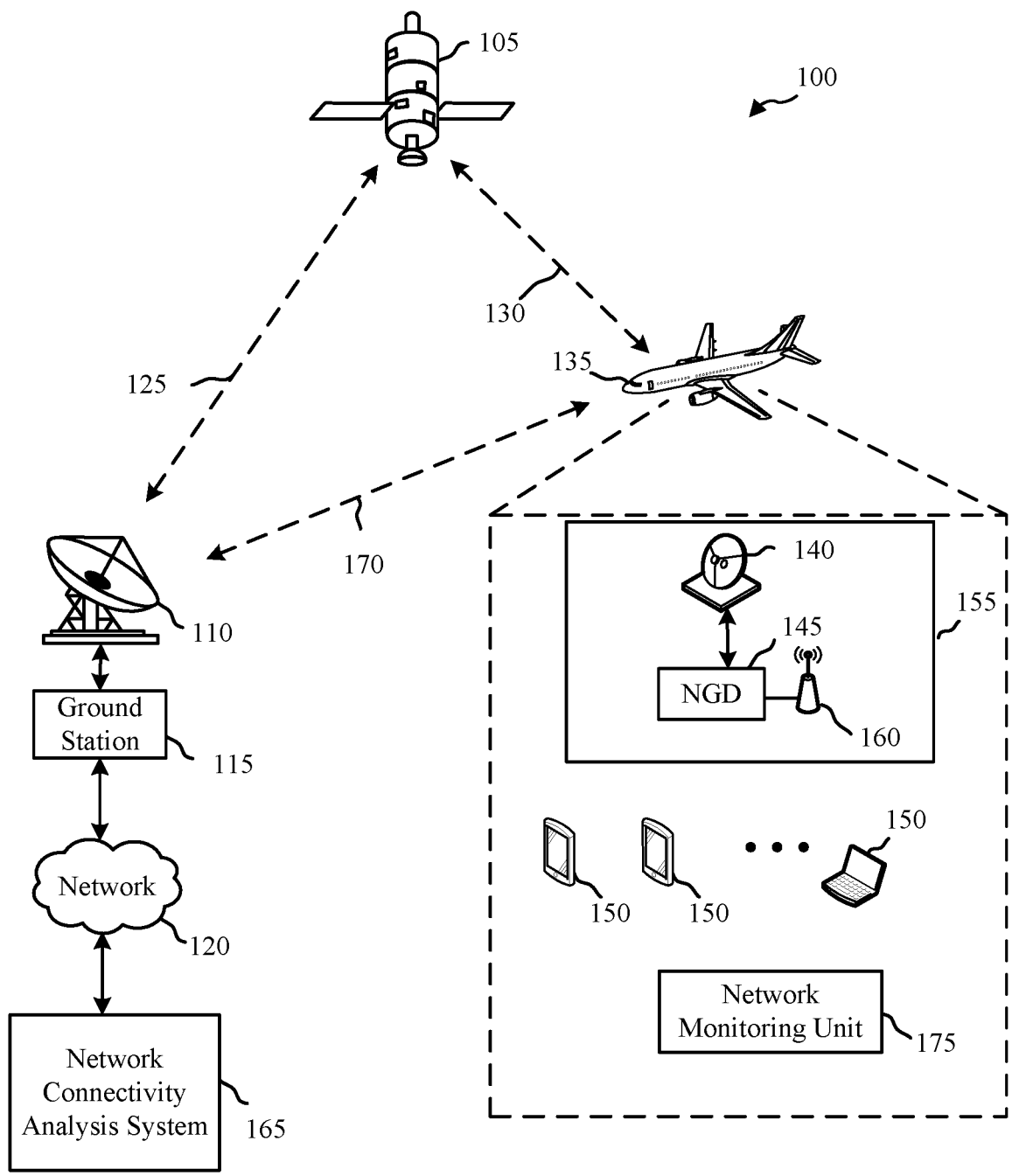
FIG. 1 shows a diagram of a communication system that supports monitoring network communications for mobile vehicles, in accordance with aspects of the present disclosure.

FIG. 1 shows a simplified diagram of an example communications system 100 which may support monitoring network communication quality for a fleet of one or more mobile vehicles in accordance with various aspects of the disclosure. The communication system 100 includes a satellite 105 (or multiple satellites 105), a ground station 115, a ground station antenna system 110, and a network access terminal 155. In operation, the communication system 100 provides network access service via the network access terminal 155 to multiple communication devices 150 on mobile vehicle 135, which may be an aircraft (depicted), train, boat, etc. For example, the communication system 100 may provide for two-way communications between the network access terminal and a network 120 via the satellite 105 and the ground station 115. For example, the communication system 100 may provide for two-way communications between the network access terminal and a network 120 or ground station 115 via an air-to-ground connection 170 (e.g., for airborne mobile vehicles).

More generally, although FIG. 1 depicts a mobile vehicle 135 that is an aircraft, similar or analogous systems may be used for terrestrial mobile vehicles, such as trains, buses, automobiles, etc. For example, a communication system 100 may provide for two-way communications between the network access terminal 155 on the vehicle 135 and a network 120 or ground station 115 via a ground-to-ground connection (e.g., for terrestrial mobile vehicles), without the use of a satellite 105.

The network access terminal 155 may include a network gateway device 145, an antenna 140, and one or more access points 160 (e.g., wired access points, wireless access points (WAPs), etc.). The communication devices 150 may be connected to the network access terminal 155 via the one or more access points 160. The network gateway device 145 may perform the functions of a modem such as modulation and demodulation of signals, packet queuing, packet acceleration/de-acceleration, and other signal processing functions. The network gateway device 145 may also perform gateway functions such as network address translation, a firewall, and the like.

The satellite or satellites 105 may include any suitable type of communication satellite. In some examples, some or all of the satellites may be in geostationary orbits. In other examples, any appropriate orbit (e.g., medium earth orbit (MEO), low earth orbit (LEO), etc.) for satellite 105 may be used.

The ground station 115 sends and receives signals to and from the satellite 105 via communication link 125 using the ground station antenna system 110. The ground station antenna system 110 may be two-way capable and designed with adequate transmit power and receive sensitivity to communicate reliably with the satellite 105.

The antenna 140 may communicate signals with the satellite 105 via the communication link 130. The antenna 140 may be mounted to an elevation and azimuth gimbal which points the antenna 140 (e.g., actively tracking) at satellite 105. The communication system 100 may operate in the International Telecommunications Union (ITU) Ku, K, or Ka-bands, for example from 17.7 to 21.2 Giga-Hertz (GHz). Alternatively, communication system 100 may operate in other frequency bands such as C-band, X-band, S-band, L-band, and the like.

In some cases, mobile vehicle 135 may be associated with or identified by various vehicle data items, such as a vehicle identifier (e.g., a tail number or vessel ID), trip number (e.g., flight number), route or travel segment number, trip duration, origination terminal identifier, destination terminal identifier, scheduled or actual departure time or date, and/or scheduled or actual arrival time or date, for example.

In some cases, various network communications data or metrics may be collected or transmitted by a network monitoring unit 175 of mobile vehicle 135 or by separate network monitoring systems; e.g., systems used by network service providers, for example. Network monitoring unit 175 may include sensors, processors, servers, transceivers, or other relevant electronics to enable network monitoring unit 175 to determine, collect, store, and/or transmit network communications data and determine, collect, store, and/or transmit network communications metrics.

Such network communication data may include a number of devices (e.g., devices that may be connected with the network), a quality of service for the devices (e.g., in terms of bandwidth, network connectivity status, error rate, or other metric), a type of the devices (e.g., laptop, cell phone, etc.), a data rate (e.g., a data transmission rate, such as in Mbits per second), a data volume (e.g., an amount of data transferred, such as in MBytes), a modulation and coding scheme for communications via the network access terminal 155, bandwidth information associated with the communications via the network access terminal 155 (e.g., an available amount of bandwidth for the network), an error rate for the communications via the network access terminal 155, a latency for the communications via the network access terminal 155 (e.g., a latency between the network and a ground-based terminal or satellite), traffic type information for traffic associated with the devices, user subscription information associated with the devices (e.g., how many devices are subscribed to the network using a default subscription or a premium subscription), a status of the network access terminal 155 (e.g., whether it is online or offline, which satellite beam it is connected to, etc.), or a status of an auxiliary equipment (e.g., such as temperature or pointing direction of an antenna) to the network access terminal 155.

In some cases, some network communication metrics may be measured or collected (e.g., by a network monitoring unit 175) using test protocols. For example, error rates, data rates, and latencies may be determined by having a device connected to the network transmit one or more test packets via the network, receive a response, and measure or determine the associated error rate, data rate, and/or latency associated with the transmission and response.

As previously discussed, network communication performance may typically be collected and analyzed by network service providers, while fleet operational information may be collected and analyzed by fleet operators. Each of these types of analyses may typically be accomplished using separate tools and methods.

However, in some cases, it may be valuable to analyze network performance metrics in the context of fleet operations; e.g., by aggregating network performance metrics based on one or more vehicle data items, such as aggregating network performance metrics by trip number, by fleet, by route, or by vehicle, for example. Such aggregation options may enable a user to analyze how network performance varies across trip number, fleet, route, or vehicle, for example, and detect correlations between various vehicle data items and network performance metrics. Such correlations may be useful for identifying the causes of lapses in network communication services, for example, or for determining demand for network communication services. Traditional tools and methods may not support such multi-dimensional analysis; accordingly, new tools and methods, such as tools and methods for monitoring network communications for mobile vehicles, are needed. In some cases, a network connectivity analysis system 165 (described in more detail with reference to FIG. 6) may support such analysis.

Although discussed in the context of communications system 100 providing a network access service to devices on aircraft, it should be understood that the tools and methods for monitoring network communications for mobile vehicles described herein are applicable to other types of communication networks (e.g., ground-based networks) or other vehicles (e.g., trains, ships, busses).

Figure 2:
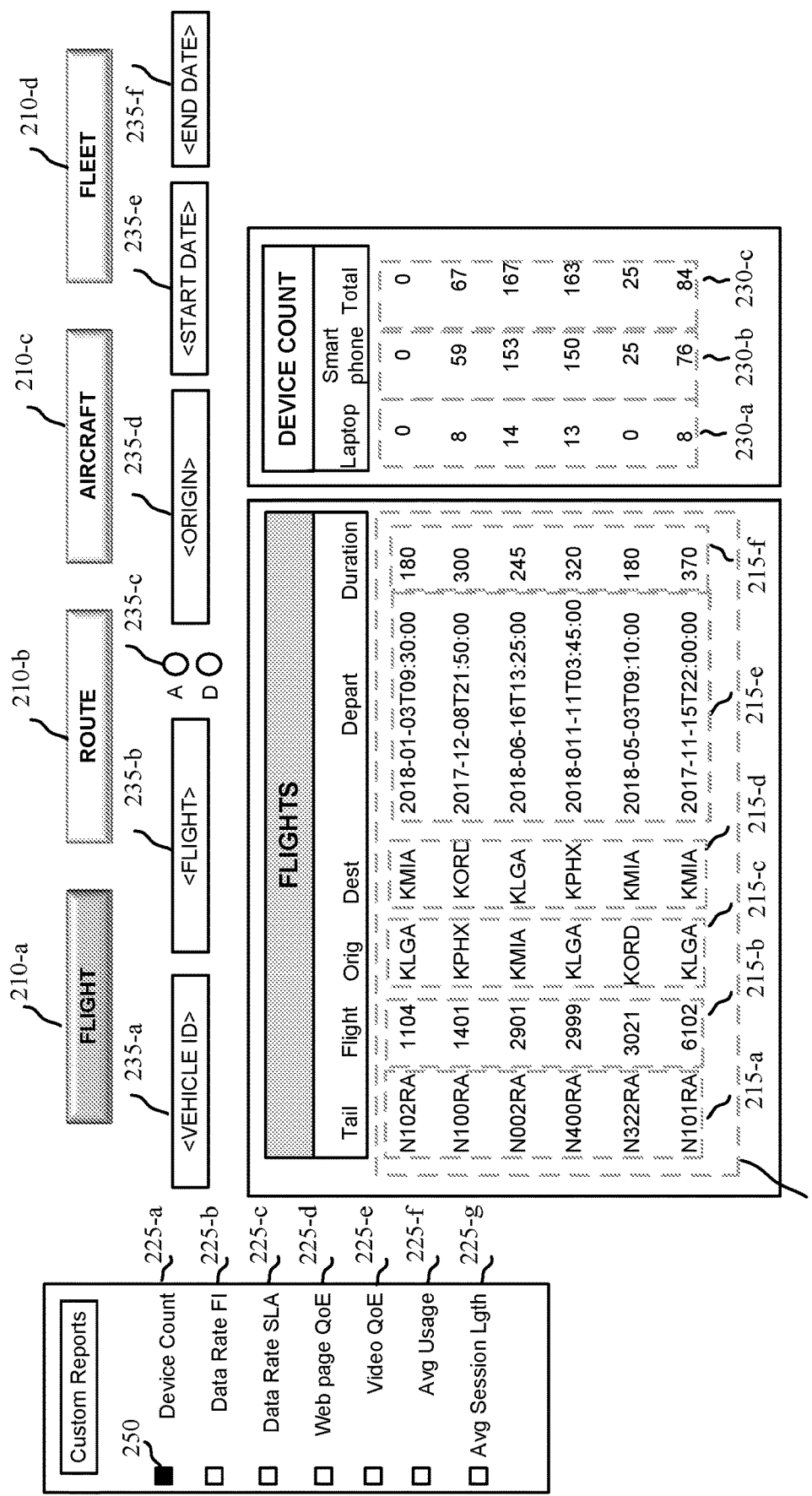
FIG. 2 illustrates a user interface that supports monitoring network communications for mobile vehicles, in accordance with aspects of the present disclosure.

FIG. 2 depicts a user interface 200 that supports monitoring network communications for mobile vehicles. User interface 200 may enable a user to view various network communication metrics aggregated by a selected aggregation option, for example. In this example, the type of mobile vehicle for which network communications are monitored may be an aircraft, which may be an example of mobile vehicle 135. User interface 200 may be presented to a user by, for example, displaying user interface 200 on an electronic display, or by transmitting data that specifies the content and formatting of user interface 200, such as by transmitting data or hypertext markup code for displaying a web page.

User interface 200 includes multiple aggregation options 210-*a*, 210-*b*, 210-*c*, 210-*d*. In some examples, each aggregation option is associated with a corresponding vehicle data item. In the example of user interface 200, aggregation options include flight 210-*a* (e.g., a flight number associated with a particular flight), route 210-*b* (e.g., a route traversed by one or more aircraft in the fleet, as indicated by a route identifier); aircraft 210-*c* (e.g., a specific aircraft identifier); and fleet 210-*d* (e.g., a particular fleet of aircraft, as indicated by a fleet identifier). A user may select an aggregation option 210 by, for example, clicking on the aggregation option 210, touching the aggregation option 210 (e.g., on a touchscreen), etc., which may provide an indication of the selected aggregation option 210 to a computing system (e.g., network connectivity analysis system 605 described with respect to FIG. 6).

Based on the user's selected aggregation option, the computing system may present, in user interface 200, a list 220 of vehicle data items 215-*a*, 215-*b*, 2150*c*, 215-*d*, 215-*e*, organized by the selected aggregation option 210. In the example depicted in FIG. 2, the user has selected the "FLIGHT" aggregation option 210-*a* (as indicated by the grayed box), and thus the list 220 of vehicle data items 215 is organized (e.g., sorted) by the flight number 215-*b*. The list 220 of vehicle data items 215 includes tail number 215-*a*, flight number 215-*b*, origin 215-*c*, destination 215-*d*, departure time 215-*e*, and flight duration 215-*e*. In some examples, the list of vehicle data items may be a subset of available vehicle data items; for example, the list of vehicle data items may exclude duration 215-*f* or another vehicle data item 215.

User interface 200 includes several additional data entry fields 235-*a*, 235-*b*, 235-*c*, 235-*d*, 235-*e*, 235-*f* in which a user may enter data to filter the entries included in list 220. In some cases, one or more of the criteria may be associated with a vehicle data item. For example, a user may enter a vehicle identifier (e.g., tail number or vessel ID) in data entry field 235-*a*, a flight number in data entry field 235-*b*, an arrival or departure indicator in data entry field 235-*c*, an origin in data entry field 235-*d*, a start date 235-*e*, and/or an end date 235-*f*. In some examples, based on the user's additional criteria, the computing system may filter the list 220 depicted in user interface 200 to only include entries that meet the specified criteria.

User interface 200 includes several network communication metric options 225-*a*, 225-*b*, 225-*c*, 225-*d*, 225-*e*, 225-*f*, 225-*g*. In some examples, each network communication metric option 225 is associated with a corresponding network communication metric. A user may select one or more network communication metric options 225 by, for example, clicking on the network communication option 225, touching the network communication option 225 (e.g., on a touchscreen), etc., which may provide an indication of the selected network communication metric option(s) 210 to a computing system (e.g., network connectivity analysis system 605 described with respect to FIG. 6).

Based on the user's selected network communication metric option(s), the computing system may present, via user interface 200, one or more network communication metrics for each of the mobile vehicles in list 220, organized by flight number 215-*b* (e.g., based on the selected aggregation option 210-*a*). In the example of FIG. 2, the user has selected the "Device Count" network communication metric option, as indicated by filled box 250. In response to this selection, user interface 200 displays network communication metrics 230-*a*, 230-*b*, 230-*c* associated with the "Device Count" network communication metric option 225-*a*. Network communication metrics 230 include the number of laptops 230-*a*, the number of smartphones 230-*b*, and the total number (laptop+smartphone) of devices 230-*c*.

In some examples, the network communication metrics 230 are concurrently presented with list 220 of vehicle data items 215 (e.g., displayed adjacent to, or caused to be displayed simultaneously in a web page) to enable a user to readily monitor or analyze network communication metrics for mobile vehicles based on the selected aggregation option. Individual values associated with each item of list 220 may be displayed for the selected network communication metrics 230.

Because the number of vehicle data items or network communication metrics for a fleet may be very large, a computing system may, before presenting the aggregation options 210 to a user, aggregate one or more of the network communication metrics based on one or more of the vehicle data items associated with the aggregation options in order to reduce the time required to present list 220 to the user. In some examples, the computing system may store the aggregated network communication metrics in a database. In some cases, a computing system may access previously aggregated network communication metrics based on the selected aggregation option.

Figure 3:
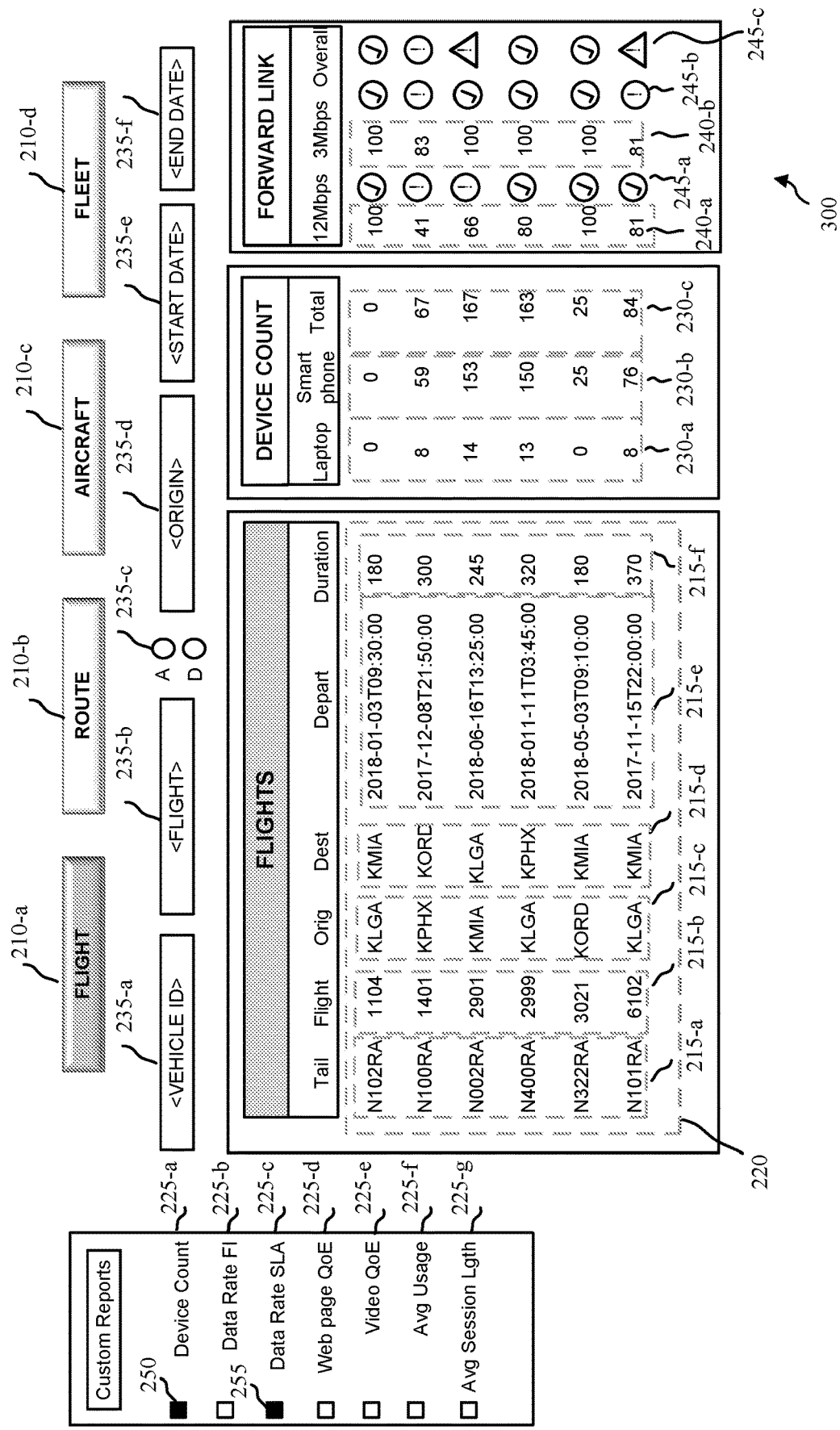
FIG. 3 illustrates a user interface that supports monitoring network communications for mobile vehicles, in accordance with aspects of the present disclosure.

FIG. 3 depicts a user interface 300 that supports monitoring network communications for mobile vehicles. In some examples, a user may, while list 220 is displayed or before list 220 is displayed, select one or more additional network communication metric options 225-a for display. In the example of FIG. 3, the user has selected both the "Device Count" network communication metric option 225-a and the "Data Rate SLA" network communication metric option 225-c, as indicated by filled boxes 250, 255. In response to this selection, user interface 300 concurrently displays network communication metrics 230-a, 230-b, 230-c associated with the "Device Count" network communication metric option 225-a, and network communication metrics 240-a, 240-b associated with the "Data Rate SLA" network communication metric option 225-c, all of which are organized by flight number 215-b (e.g., based on the selected aggregation option 210-a).

Network communication metrics 240 include a premium (e.g., a 12 Mbps link) forward link metric 240-a and a default (e.g., 3 Mbps) forward link metric 240-c. The percentages may indicate the percentage of an available forward link that is operational or available, average data rate, or percentage of time that the forward link met the SLA service threshold (e.g., 12 Mbps, 3 Mbps), for example. Network communication metrics 240 may be determined using test protocols (e.g., a test device on the aircraft), or by analysis of user data (e.g., percentage of time that a requested amount of data at or exceeding the SLA service threshold was provided at a rate that met or exceeded the threshold. User interface 300 further includes several network communication metric scores 245-a, 245-b, 245-c associated with network communication metrics 240. Network communication metric scores 245 include a 12 Mbps score 245-a, a 3 Mbps score 245-b, and an overall score 245-c. In this example, network communication metric scores 245-a, 245-b, 245-c are indicated by graphical elements that convey the quality of the link. For example, a check mark graphical element may indicate that the forward link metric is within an acceptable range. An exclamation mark graphical element may indicate that the forward link metric is not within an acceptable range, and different shapes or colors of the graphical elements may indicate which of several predetermined ranges the forward link metric falls into. For example, a yellow triangle may indicate a range below the acceptable range while a red circle may indicate a range below the range indicated by the yellow triangle. In some cases, a graphical element (e.g., gray circle, question mark, or line) may indicate that no data exists for the metric.

In other examples, network communication metric scores may be indicated in another manner; e.g., they may be indicated by a number (e.g., 1 to 5), a grade rating (e.g., A to F), etc.

In some examples, network communication metric scores 245 may be determined by comparing network communication metrics 240 (e.g., a plurality of values of the one or more network communication metrics) with one or more threshold values and determining the scores based on the comparisons. For example, the premium forward link score 240-b and default forward link score 240-d may be determined by comparing the premium forward link metric 240-a and the default forward link metric 240-c to one or more threshold values. In some examples, overall score 245-c may be determined by comparing an average of the values of a forward link metric over a certain time frame to a threshold, and determining the score based on the comparison.

Figure 4:
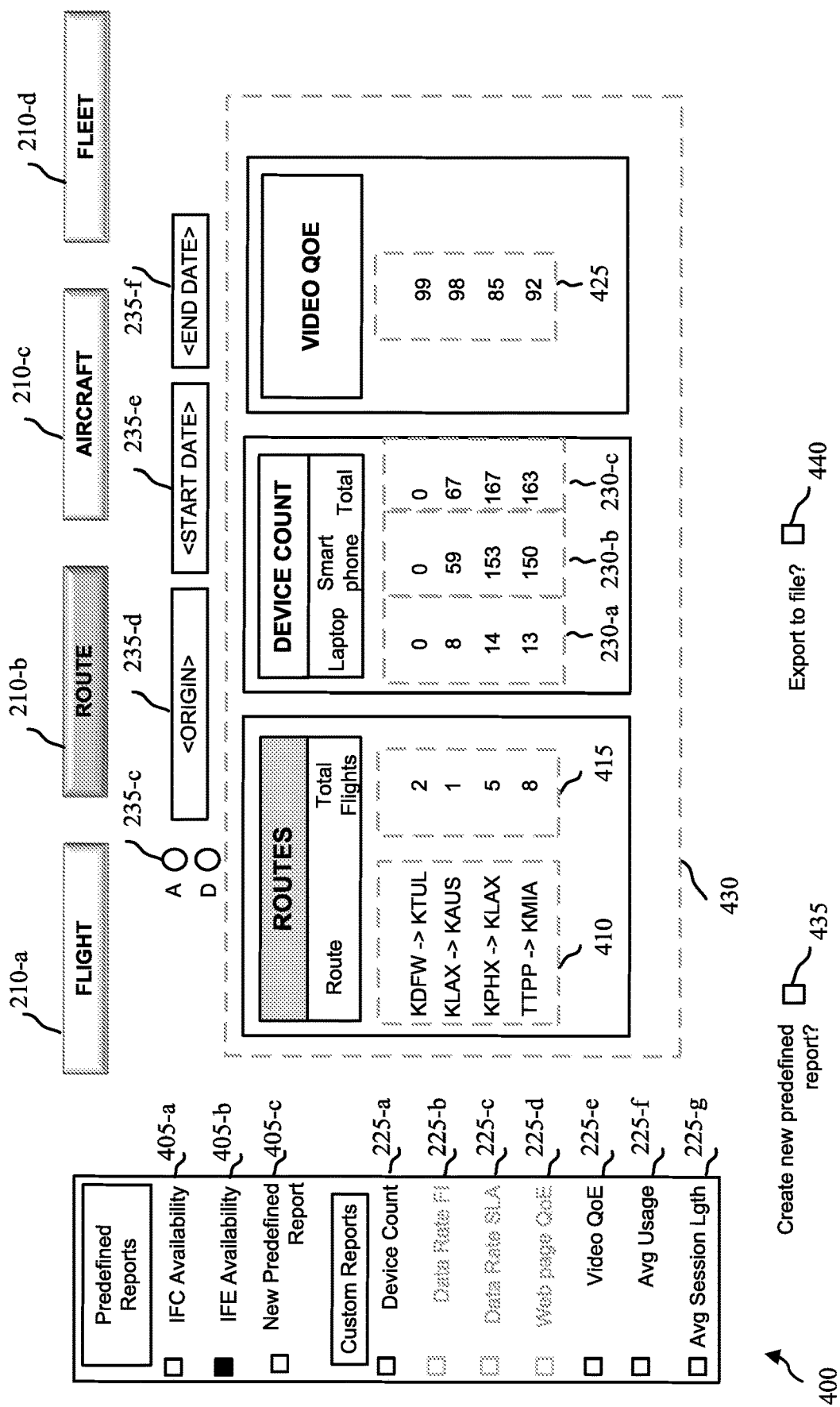
FIG. 4 illustrates a user interface that supports monitoring network communications for mobile vehicles, in accordance with aspects of the present disclosure.

FIG. 4 depicts a user interface 400 that supports monitoring network communications for mobile vehicles. In the example of user interface 400, the user has selected the "ROUTE" aggregation option 210-b (as indicated by the grayed box). In some examples, the data entry field 235 displayed in user interface 200, 300, 400 may vary depending on the selected aggregation option 210. In the example of user interface 400, the data entry field 235 displayed when the "ROUTE" aggregation option 210-b is selected is a subset of the data entry field 235 displayed when the "FLIGHT" aggregation option 210-a is selected (e.g., as in FIGS. 2-3).

User interface 400 includes predefined report options 405-a, 405-b, each of which is associated with a predefined combination of one or more vehicle data items and a set of network communication metrics. By providing predefined report options 405, interface 400 may provide an efficient mechanism for a user to select and view commonly used combinations of network communication metrics and vehicle data items. In some examples, the predefined report options 405 may vary depending on the selected aggregation option 210.

In the example of user interface 400, the user has selected the "IFE Availability" (i.e., in-flight entertainment availability) predefined report option 405-b. Based on the user's selected predefined report option 405-a, the computing system may present, in user interface 400, a predefined report 430 that vehicle data items 410, 415 and a set of network communication metrics 230-a, 230-b, 230-c, 425. In this example, the vehicle data items include a route 410 and a number of flights 415, which are presented organized by route 410. The set of network communication metrics includes a number of laptops 230-a, number of smartphones 230-b, total number (laptop+smartphone) of devices 230-c, and video quality of experience (QOE) metric 425, all of which are presented organized by route 410 (e.g., displayed based on selected aggregation option 210-b). In some cases, the video QOE metric may be a percentage of packets successfully received or transmitted, a provided data rate relative to a requested data rate for a streaming session, or a metric associated with an amount of buffering of a streaming session (e.g., test protocol streaming session).

In some examples, a user interface for monitoring network communications for mobile vehicles (e.g., user interface 200, 300, 400) may enable a user to create a new predefined report option 405 based on the currently selected network communication metric options 225. For example, a user may select one or more network communication metric options 225. In response to this selection, the computing system may present network communication metrics associated with the selected network communication metric options 225, as described with respect to FIGS. 2-3. After (or while) the network communication metrics are presented (e.g., displayed), the user may indicate a request for a new predefined report option by, e.g., selecting box 435 as shown in user interface 400, or in another manner. In response to receiving an indication of the request for a new predefined report, the computing system may add a new predefined report option 405-c to the predefined report options 405; e.g., new predefined report option 405-c may be displayed adjacent to or along with the other predefined report options 405 when user interface 400 is subsequently invoked. The new predefined report option 405-c may be associated with the presented network communication metrics such that when a user subsequently selects the new predefined report option 405-c, the same network communication metrics are presented.

In some examples, a user interface for monitoring network communications for mobile vehicles (e.g., user interface 200, 300, 400) may enable a user to export the vehicle data items and network communication metrics. For example, after (or while) the network communication metrics are presented, the user may indicate a data export request by, e.g., selecting box 440 as shown in user interface 400, or in another manner. In response to receiving an indication of the data export request, the computing system may export the presented (e.g., currently displayed) set of vehicle data items and network communication metrics to a file, such as a spreadsheet file, a text file, or some other type of file, by saving the vehicle data items and network communication metrics in the file.

Figure 5:
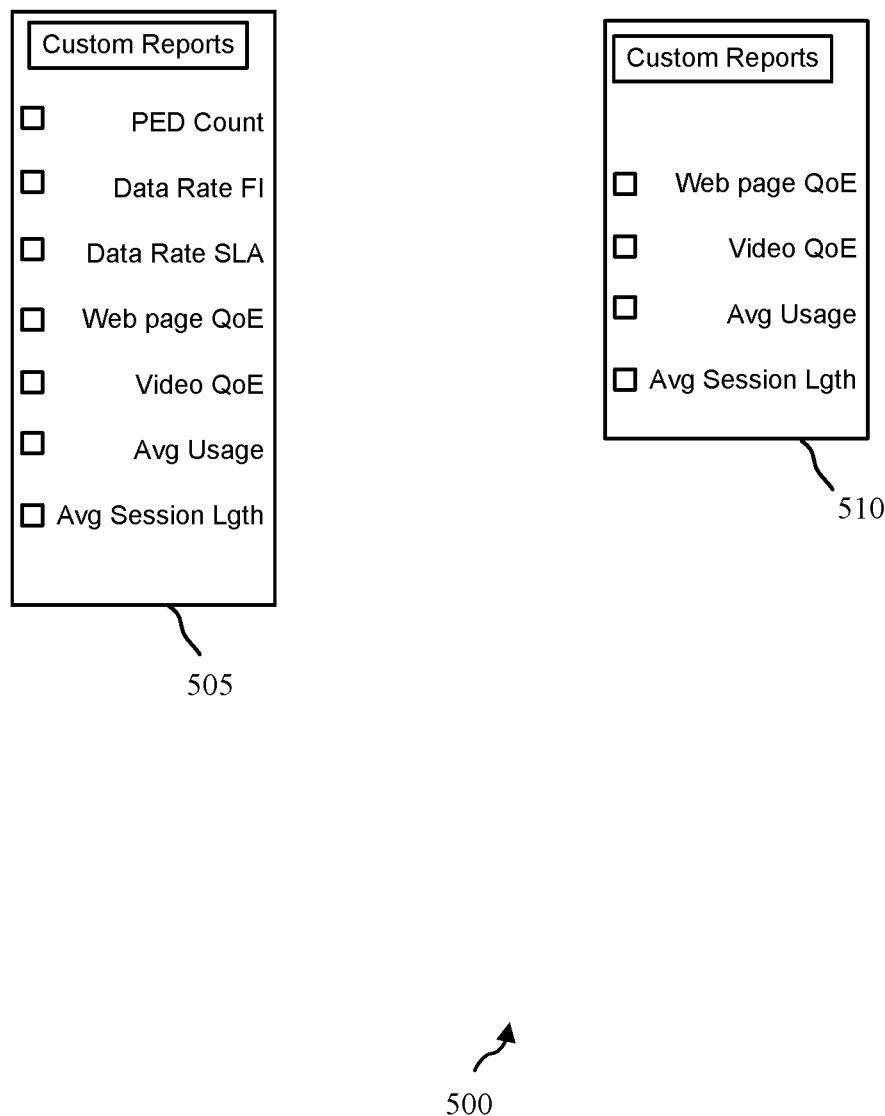
FIG. 5 illustrates a user interface that supports monitoring network communications for mobile vehicles, in accordance with aspects of the present disclosure.

FIG. 5 depicts user interfaces 500 that support monitoring network communications for mobile vehicles. In some examples, network communication metric options (e.g., network communication metric options 225) presented to a user may be a subset of available network communication metric options. In some examples, the subset of network communication metric options presented to a user may be determined based on a credential of the user. Such a credential may include a user authorization level, a user employer, (e.g., indicating whether the user is an airline employee or a network provider employee), etc., which may be stored in a database, for example.

By way of example, network communication metric options 505 presented to a first user may be a full set of available network communication options and may be presented to the first user based on a credential of the first user. Network communication metric options 510 presented to a second user may be a subset of available network communication metric options and may be presented to the second user based on a credential of the second user. In this example, the set of network communication metric options 510 presented to the second user is a subset of the set of network communication metric options 505 presented to the first user. In other examples, different users may be presented with different subsets of network communication metric options having no overlap; i.e., having no network communication metric options in common.

Figure 6:
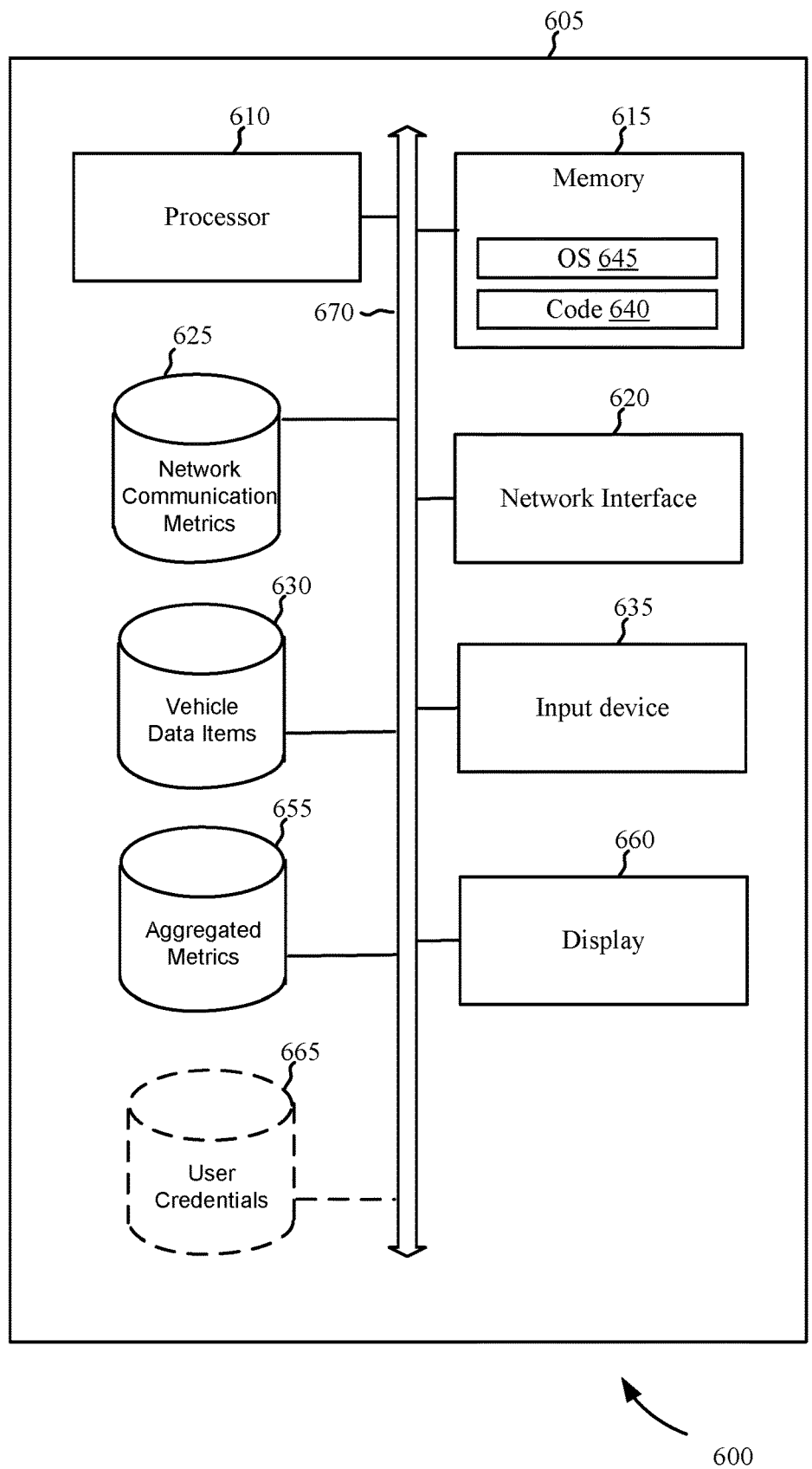
FIG. 6 shows a diagram of a computing system that supports monitoring network communications for mobile vehicles, in accordance with aspects of the present disclosure.

FIG. 6 shows a block diagram 600 of a network connectivity analysis system 605 that may support monitoring network communications for mobile vehicles in accordance with aspects of the present disclosure. The network connectivity analysis system 605 may be an example of network connectivity analysis system 165 described with reference to FIG. 1. The network connectivity analysis system 605 may include a processor 610, memory 615, network interface 620, network communication metrics database 625, vehicle data items database 630, aggregated metrics database 655, optional user credentials database 665, input device 635, and display 660. Each of these components may be in communication with each other, directly or indirectly, over one or more buses 670.

The memory 615 may include random access memory (RAM) and/or read-only memory (ROM). The memory 615 may store an operating system (OS) 645 (e.g., built on a Linux or Windows kernel). The memory 615 may also store computer-readable, computer-executable code 640 including instructions that are configured to, when executed, cause the processor 610 to perform various functions described herein related to monitoring network communications for mobile vehicles. Alternatively, the code 640 may not be directly executable by the processor 610 but be configured to cause the network connectivity analysis system 605 (e.g., when compiled and executed) to perform one or more of the functions described herein.

The network communication metrics database 625 may store network communication metrics associated with a network access service, such as the network communication metrics 230, 240, 425 described with respect to FIGS. 2-4. The network communication metrics database 625 may store network communication metrics received from a network access terminal, such as network access terminal 155.

The vehicle data items database 630 may store vehicle data items associated with a mobile vehicle (e.g., mobile vehicle 135), such as vehicle data items 215, 410, 415 described with respect to FIGS. 2-4.

The optional user credentials database 665 may store credentials associated with users, such as an employee identification, employer, position, etc. Such user credentials may be associated with a user password, for example.

Input device 635 may be used, by a user, to provide an indication of an aggregation option (e.g., aggregation option 210), a network communication metric option (e.g., network communication metric option 225), and/or an input data field (e.g., field 235). Input device 635 may be a keyboard, for example, or a microphone, a touchscreen, or any other appropriate input hardware.

Display 660 may be used to display (e.g., present), to a user, user interfaces for monitoring network communications for mobile vehicles such as user interfaces 200, 300, 400, 500 described with respect to FIGS. 2-5. Display 660 may be an electronic display, such as a CRT display, LCD display, touchscreen, mobile device screen, etc.

In some cases, the components of network connectivity analysis system 605 may be located within a single location or enclosure. In some cases, the components of network connectivity analysis system 605 may be distributed across multiple locations or enclosures. For example, network communication metrics database 625, vehicle data items database 630, aggregated metrics database 655, and/or user credentials database 665 may each reside at different locations, which may be different than a location of display 660 or other components of network connectivity analysis system 605. In some cases, network communication metrics database 625, vehicle data items database 630, aggregated metrics database 655, and/or user credentials database 665 may be accessed remotely (e.g., via a network 120).

Figure 7:
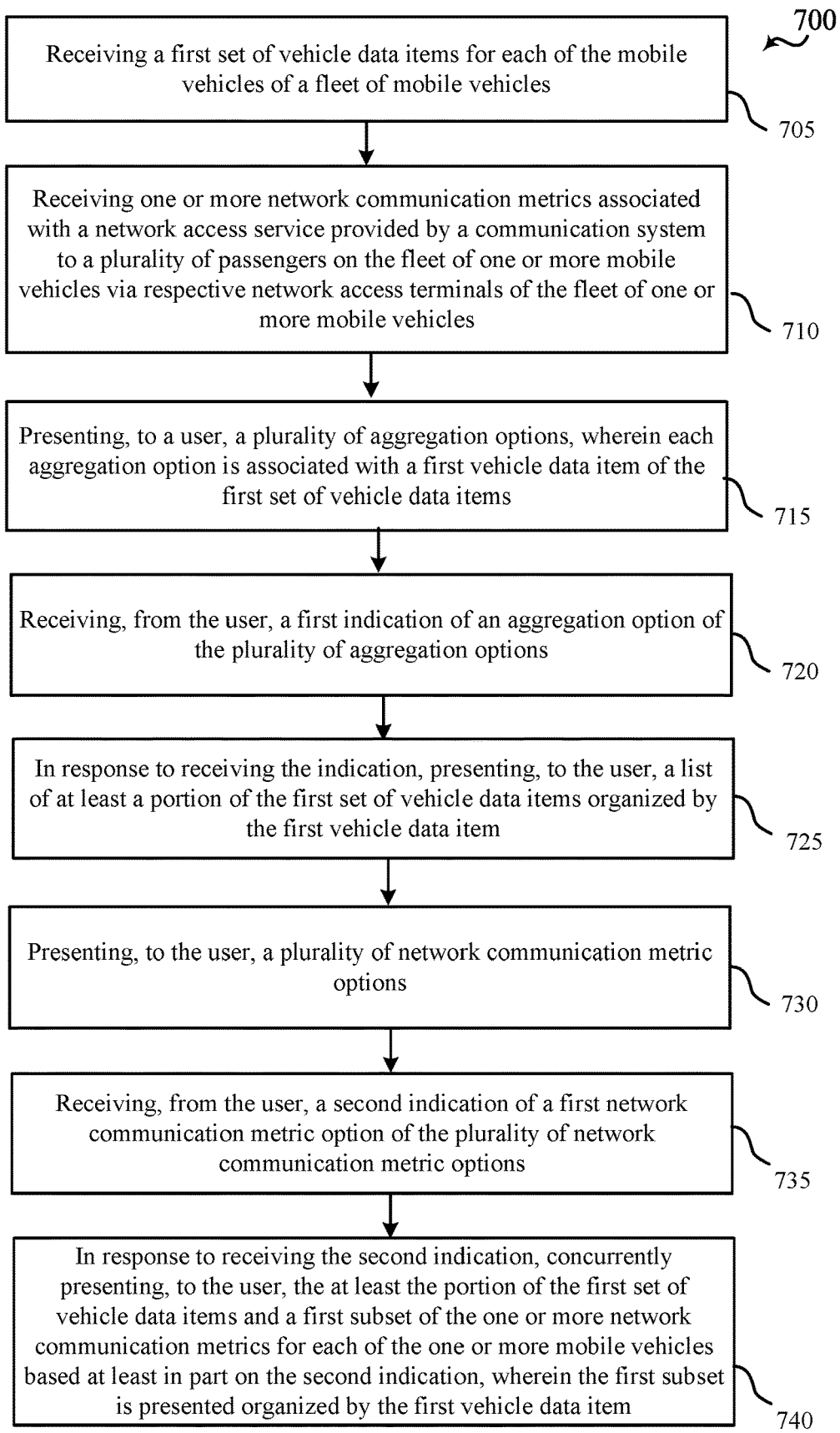
FIG. 7 illustrates a flow chart of an example method that supports monitoring network communications for mobile vehicles, in accordance with aspects of the present disclosure.

FIG. 7 depicts a method of monitoring network communications for mobile vehicles, in accordance with various embodiments of the disclosure.

Block 705 may include receiving a first set of vehicle data items for each of the mobile vehicles of a fleet of mobile vehicles. In some cases, the vehicle data items may be received from a mobile vehicle or from a fleet operator, for example.

Block 710 may include receiving one or more network communication metrics associated with a network access service provided by a communication system to a plurality of passengers on the fleet of one or more mobile vehicles via respective network access terminals of the fleet of one or more mobile vehicles.

Block 715 may include presenting, to a user, a plurality of aggregation options (e.g., aggregation options 210), wherein each aggregation option is associated with a first vehicle data item (e.g., vehicle data item 215, 410) of the first set of vehicle data items.

Block 720 may include receiving, from the user, a first indication of an aggregation option of the plurality of aggregation options (e.g., via input device 635).

Block 725 may include, in response to receiving the indication, presenting, to the user, a list (e.g., list 220) of at least a portion of the first set of vehicle data items (e.g., vehicle data items 215) organized by the first vehicle data item (e.g., vehicle data item 215-*b*).

Block 730 may include presenting, to the user, a plurality of network communication metric options (e.g., network communication metric options 225).

Block 725 may include receiving, from the user, a second indication of a first network communication metric option of the plurality of network communication metric options (e.g., via input device 635).

Block 740 may include, in response to receiving the second indication, concurrently presenting, to the user, the at least the portion of the first set of vehicle data items and a first subset of the one or more network communication metrics for each of the one or more mobile vehicles based at least in part on the second indication, wherein the first subset is presented organized by the first vehicle data item.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical positions. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of monitoring network communication quality for a fleet of mobile vehicles, the method comprising:
receiving a first set of two or more vehicle data items for each mobile vehicle of the fleet of mobile vehicles;
receiving one or more network communication metrics associated with a network access service provided by a communication system to a plurality of devices on the fleet of mobile vehicles via respective network access terminals of the fleet of mobile vehicles;
aggregating the one or more network communication metrics across one or more of the first set of vehicle data items;
storing the aggregated one or more network communication metrics in a database;
presenting, to a user, a plurality of aggregation options, wherein each aggregation option is associated with a first vehicle data item of the first set of vehicle data items;
receiving, from the user, a first indication of an aggregation option of the plurality of aggregation options;
in response to receiving the first indication, presenting, to the user, a list of at least a portion of the first set of vehicle data items organized by the first vehicle data item;
presenting, to the user, a plurality of network communication metric options;
receiving, from the user, a second indication of a first network communication metric option of the plurality of network communication metric options; and
in response to receiving the second indication, retrieving a first subset of the aggregated one or more network communication metrics aggregated across the first vehicle data item;
concurrently presenting, to the user, the at least the portion of the first set of vehicle data items and the first subset of the aggregated one or more network communication metrics based at least in part on the second indication, wherein the first subset of the aggregated one or more network communication metrics are presented organized by the first vehicle data item.

2. The method of claim 1, further comprising:
determining a network communication metric score for the first subset of the aggregated one or more network communication metrics based at least in part on comparing a function of the first subset of the aggregated one or more network communication metrics with a threshold; and
presenting, to the user, an indication of the network communication metric score.

3. The method of claim 1, wherein the first set of vehicle data items comprises one or more of a vehicle identifier, a route, a fleet identifier, a destination, or a trip duration.

4. The method of claim 1, wherein the one or more network communication metrics comprise one or more of: a number of the plurality of devices, a quality of service for the plurality of devices, a type of the plurality of devices, a data rate, a data volume, a modulation and coding scheme for communications via the network access terminal, bandwidth information associated with the communications via the network access terminal, an error rate for the communications via the network access terminal, a latency for the communications via the network access terminal, traffic type information for traffic associated with the plurality of devices, user subscription information associated with the plurality of devices, a status of the network access terminal, or a status of an auxiliary equipment to the network access terminal.

5. The method of claim 1, further comprising:
receiving, from the user, a third indication of a second network communication metric option of the plurality of network communication metric options;
in response to receiving the third indication, retrieving from the database a second subset of the aggregated one or more network communication metrics aggregated across the first vehicle data item; and
concurrently presenting, to the user based at least in part on the third indication, the first subset and the second subset of the aggregated one or more network communication metrics organized by the first vehicle data item.

6. The method of claim 1, wherein the plurality of network communication metric options corresponds to a subset of a set of available network communication metric options, and wherein the subset of the set of available network communication metric options is determined based on a credential of the user.

7. The method of claim 1, further comprising:
presenting at least one predefined report option to the user, each of the at least one predefined report option associated with a predefined combination of one of the first set of vehicle data items and a set of the aggregated one or more network communication metrics;
receiving, from the user, a fourth indication of a selected predefined report option; and
in response to receiving the fourth indication, presenting, to the user, a predefined report associated with the selected predefined report option, wherein the predefined report comprises the set of the aggregated one or more network communication metrics presented organized by the one of the first set of vehicle data items.

8. The method of claim 7, further comprising:
after presenting the first subset of the aggregated one or more network communication metrics, receiving an indication of a request for a new predefined report option; and
in response to receiving the indication of the request for the new predefined report option, adding a first predefined report option to the at least one predefined report option, the first predefined report option associated with the first subset of the aggregated one or more network communication metrics.

9. The method of claim 1, wherein the first subset of the aggregated one or more network communication metrics is determined based at least in part on a credential of the user.

10. The method of claim 1, further comprising:
receiving an indication of a data export request; and
in response to receiving the indication, exporting, to a file, the at least the portion of the first set of vehicle data items and the first subset of the aggregated one or more network communication metrics.

11. An apparatus for monitoring network communication quality for a fleet of mobile vehicles, comprising:

a processor, memory in electronic communication with the processor; and instructions stored in the memory and executable by the processor to cause the apparatus to:
receive a first set of two or more vehicle data items for each mobile vehicle of the fleet of mobile vehicles;
receive one or more network communication metrics associated with a network access service provided by a communication system to a plurality of devices on the fleet of mobile vehicles via respective network access terminals of the fleet of mobile vehicles;
aggregate the one or more network communication metrics across one or more of the first set of vehicle data items;
store the aggregated one or more network communication metrics in a database;
present, to a user, a plurality of aggregation options, wherein each aggregation option is associated with a first vehicle data item of the first set of vehicle data items;
receive, from the user, a first indication of an aggregation option of the plurality of aggregation options;
in response to receiving the first indication, present, to the user, a list of at least a portion of the first set of vehicle data items organized by the first vehicle data item;
present, to the user, a plurality of network communication metric options;
receive, from the user, a second indication of a first network communication metric option of the plurality of network communication metric options; and
in response to receiving the second indication, retrieve a first subset of the aggregated one or more network communication metrics aggregated across the first vehicle data item;
concurrently present, to the user, the at least the portion of the first set of vehicle data items and the first subset of the aggregated one or more network communication metrics based at least in part on the second indication, wherein the first subset of the aggregated one or more network communication metrics are presented organized by the first vehicle data item.

12. The apparatus of claim 11, wherein the instructions executable by the processor further comprise instructions to:
determine a network communication metric score for the first subset of the aggregated one or more network communication metrics based at least in part on comparing a function of the first subset of the aggregated one or more network communication metrics with a threshold; and
present, to the user, an indication of the network communication metric score.

13. The apparatus of claim 11, wherein the first set of vehicle data items comprises one or more of a vehicle identifier, a route, a fleet identifier, a destination, or a trip duration.

14. The apparatus of claim 11, wherein the one or more network communication metrics comprise one or more of: a number of the plurality of devices, a quality of service for the plurality of devices, a type of the plurality of devices, a data rate, a data volume, a modulation and coding scheme for communications via the network access terminal, bandwidth information associated with the communications via the network access terminal, an error rate for the communications via the network access terminal, a latency for the communications via the network access terminal, traffic type information for traffic associated with the plurality of devices, user subscription information associated with the plurality of devices, a status of the network access terminal, or a status of an auxiliary equipment to the network access terminal.

15. The apparatus of claim 11, wherein the instructions are further executable by the processor to cause the apparatus to:
receive, from the user, a third indication of a second network communication metric option of the plurality of network communication metric options;
in response to receiving the third indication, retrieve from the database a second subset of the aggregated one or more network communication metrics aggregated across the first vehicle data item; and
concurrently present, to the user based at least in part on the third indication, the first subset and the second subset of the aggregated one or more network communication metrics organized by the first vehicle data item.

16. The apparatus of claim 11, wherein the plurality of network communication metric options corresponds to a subset of a set of available network communication metric options, and wherein the subset of the set of available network communication metric options is determined based on a credential of the user.

17. The apparatus of claim 11, wherein the instructions are further executable by the processor to cause the apparatus to:
present at least one predefined report option to the user, each of the at least one predefined report option associated with a predefined combination of one of the first set of vehicle data items and a set of the aggregated one or more network communication metrics;
receive, from the user, a fourth indication of a selected predefined report option; and
in response to receiving the fourth indication, present, to the user, a predefined report associated with the selected predefined report option, wherein the predefined report comprises the set of the aggregated one or more network communication metrics presented organized by the one of the first set of vehicle data items.

18. The apparatus of claim 17, wherein the instructions are further executable by the processor to cause the apparatus to:
after presenting the first subset of the aggregated one or more network communication metrics, receive an indication of a request for a new predefined report option; and
in response to receiving the indication of the request for the new predefined report option, add a first predefined report option to the at least one predefined report option, the first predefined report option associated with the first subset of the aggregated one or more network communication metrics.

19. The apparatus of claim 11, wherein the first subset of the aggregated one or more network communication metrics is determined based at least in part on a credential of the user.

20. The apparatus of claim 11, wherein the instructions are further executable by the processor to cause the apparatus to:
receive an indication of a data export request; and
in response to receiving the indication, export, to a file, the at least the portion of the first set of vehicle data items and the first subset of the aggregated one or more network communication metrics.

* * * * *